United States Patent [19]

McKenna

[11] Patent Number: 4,464,721

[45] Date of Patent: Aug. 7, 1984

[54] DIGITIZED PICKOFF SYSTEM

[75] Inventor: Joseph V. McKenna, Franklin Lakes, N.J.

[73] Assignee: The Singer Company, Little Falls, N.J.

[21] Appl. No.: 346,690

[22] Filed: Feb. 8, 1982

[51] Int. Cl.³ .............................................. G01P 15/08
[52] U.S. Cl. ..................................... 364/453; 364/559;
 73/517 B; 74/5.6 D
[58] Field of Search ....................... 364/453, 454, 559;
 73/504, 510, 511, 516 R, 517 R, 517 B, 178 R;
 74/5.6 R, 5.6 D, 5.6 E

[56] References Cited

U.S. PATENT DOCUMENTS

| | | | |
|---|---|---|---|
| 3,707,091 | 12/1972 | Morris et al. | 73/517 B |
| 3,782,205 | 1/1974 | Fletcher et al. | 73/517 B |
| 3,797,320 | 3/1974 | Clampitt | 73/517 B |
| 3,797,321 | 3/1974 | Morris | 73/517 B |
| 3,913,406 | 10/1975 | Johnson | 73/517 B |
| 4,329,884 | 5/1982 | Ferriss | 74/5.6 D |
| 4,386,535 | 6/1983 | Albert | 74/5.6 D |
| 4,417,234 | 11/1983 | McKenna | 364/453 |

Primary Examiner—Gary Chin
Attorney, Agent, or Firm—Morris Liss; Thomas W. Kennedy

[57] ABSTRACT

A digitized pickoff system is provided for sensing displacement of complementary elements of a dual element pickoff assembly in an inertial sensor for use in an inertial navigation system comprising a relaxation oscillator adapted to sequentially select each of the pickoff elements with the reactance of the selected element determining the oscillating frequency thereof, a data converter adapted to measure the oscillating period thereof, and logic means having an output of a digital number which is proportional to the difference of oscillator periods of the two elements of the dual element pickoff assembly and which is a digital representation of the pickoff displacement.

7 Claims, 5 Drawing Figures

DIGITIZED PICKOFF SYSTEM

BACKGROUND OF THE INVENTION

The present invention relates to a pickoff system for use with an inertial navigation assembly and particularly to a digitized pickoff system having a relaxation oscillator for use with an inertial sensor of an inertial navigation assembly.

The digitized pickoff system according to the present invention is intended to generate a digitized error signal from the pickoff elements of conventional inertial sensors, i.e., gyroscopes and accelerometers. The digital error may then be introduced to microcomputer circuitry wherein capture loop stabilization is effected.

The conventional inertial sensors are equipped with either variable inductance or variable capacitance error pickoffs, composed of two diametrically opposed elements. Displacement error of the sensor causes air gap variations which increase the reactance of one element and reduce that of its companion element.

The prior art pickoff system, by which pickoff error signal is generated, relies on connections of pickoff elements in series and exciting each end of the combination with a different polarity of balanced carrier signals referred to ground. An error signal, relative to ground, then appears at the junction of the pickoff elements. This signal is normally introduced to a carrier amplifier, then to a demodulator, excited by a carrier reference, whose output is the analog of displacement error in the sensor. The prior art pickoff system includes capture loops for these sensors, which require the inclusion of the above circuitry and the use of an analog to digital converter between the analog error and the digital processor input.

The primary disadvantage of the prior art pickoff system is the extent of circuitry required, i.e., a reference excitation source, an excitation transformer, a preamplifier, a demodulator and a standard analog to digital converter.

A second disadvantage of the prior art pickoff system is the sensitivity of digital output to offset of the demodulator and the analog to digital converter, compared to virtual insensitivity to amplifier offset voltage in the circuit in the invention.

SUMMARY OF THE INVENTION

In accordance with one embodiment of the present invention, the aforementioned extent of circuitry is minimized by using a relaxation oscillator connected to the pickoff elements, a data converter connected to the relaxation oscillator, and logic means connected to the data converter and having an output providing a digital representation of the pickoff displacement.

Accordingly, it is one object of the present invention to provide a digitized pickoff system for use with an inertial sensor of an inertial navigation assembly, wherein the extent and quantity, and size and cost of circuitry is minimized.

It is another object of the invention to provide a digitized pickoff system for use with an inertial sensor of an inertial navigation system, wherein the sensitivity to amplifier offset is minimized.

According to the present invention, a digitized pickoff system is provided for sensing relative displacement of two spaced pickoff elements comprising, a relaxation oscillator adapted to sequentially select a pickoff element and adapted to determine the oscillating frequency of the selected pickoff element, a data converter adapted to measure the period of the oscillating frequency of the selected pickoff element, and logic means for measuring the difference in periods and having a digital output for providing a digital representation of the period difference as the measure of the relative displacement of the two pickoff elements.

Further objects and advantages of the present invention will become apparent upon reading the following description and the drawings.

DESCRIPTION OF THE INVENTION

Figure 1:
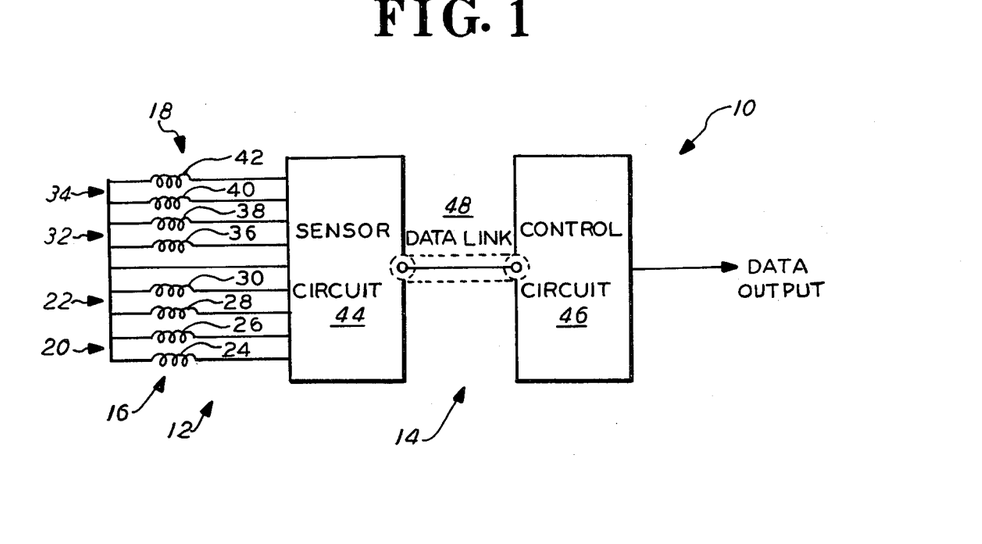
FIG. 1 is a block diagram of a digitized pickoff system according to the invention.

In FIG. 1, a digitized pickoff system 10 is shown. Digitized pickoff system 10 includes an inertial measurement unit 12, and a pickoff digitizing circuitry 14.

In FIG. 1, inertial measurement unit 12 includes a first gyro, or inertial sensor 16, and a second gyro, or inertial sensor 18. First gyro 16 has a first pickoff assembly 20 and a second pickoff assembly 22. Pickoff 20 has a first pickoff element 24 and a second pickoff element 26. Pickoff 22 has a first element 28 and a second element 30. Second gyro 18 has a first pickoff assembly 32 and a second pickoff assembly 34. Pickoff 32 has a first element 36 and a second element 38. Pickoff 34 has a first element 40 and a second element 42. A prior art gyro, such as gyro 16 and gyro 18, is shown and described in U.S. Pat. No. 3,354,726 of inventors W. J. Krupick and R. Cimera, which is assigned to the same assignee as this invention.

As shown in FIG. 1, pickoff digitizing circuitry 14 includes a sensor circuit 44, a control circuit 46, and a data link 48.

Figure 2:
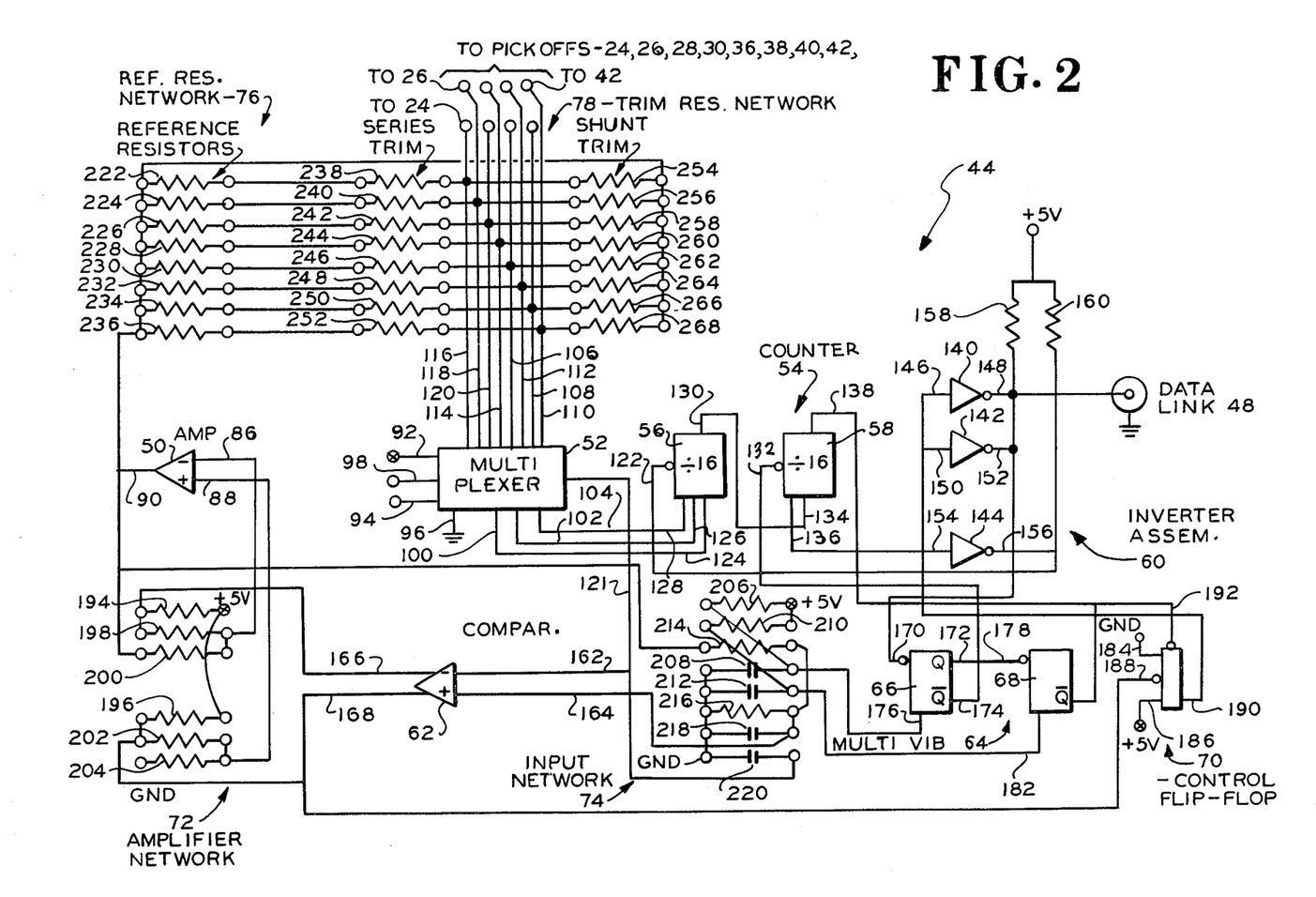
FIG. 2 is a schematic drawing of a sensor circuit portion of the system of FIG. 1.

In FIG. 2, a sensor circuit 44 is shown. Sensor circuit 44 includes a high speed differential amplifier 50, a multiplexer 52, and a dual counter 54, which has a sensor channel counter section 56 and a sensor index counter section 58. Sensor circuit 44 also includes an inverter assembly 60, a comparator 62, and a dual multivibrator unit 64, which has a first one-shot multivibrator 66 and a second one-shot multivibrator 68. Sensor circuit 44 also includes a control flip-flop 70, an amplifier network 72, a multivibrator and comparator input network 74, a reference resistor network 76, and a trim resistor network 78.

A relaxation oscillator is formed by the assembly of the aforementioned amplifier 50, multiplexer 52, comparator 62, amplifier network 72, input network 74, and reference resistance network 76. Logic means includes the assembly of the aforementioned sensor channel counter 56, index counter 58, inverter assembly 60, multivibrator 64 and control flip-flop 70.

Figure 3:
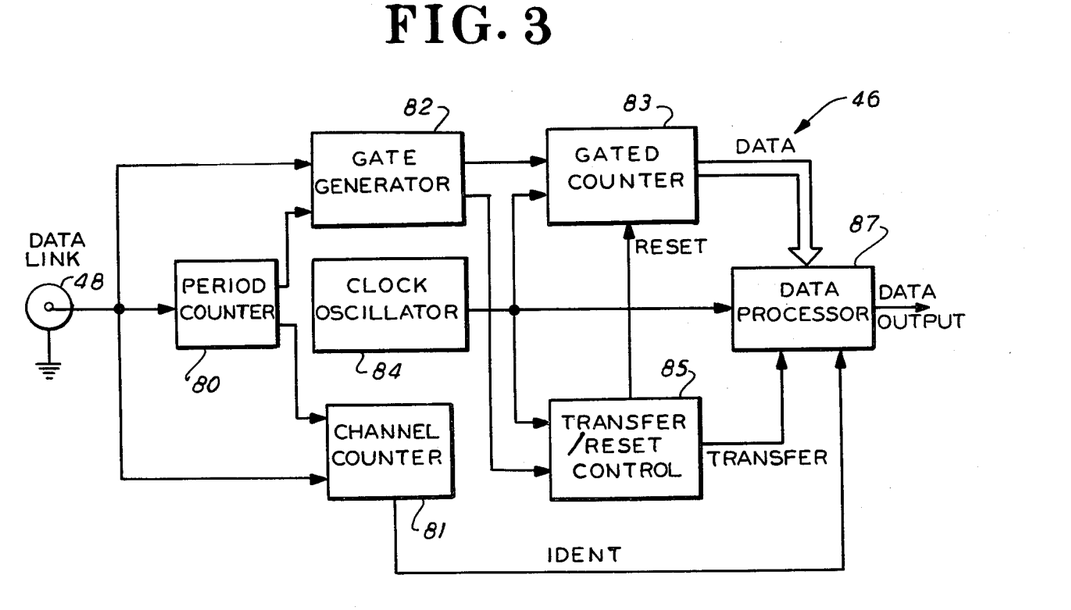
FIG. 3 is a block diagram of a control circuit portion of the system of FIG. 1.

In FIG. 3, the control circuit 46 is shown. Control circuit 46 includes a control period counter 80, a control channel counter 81, a gate generator 82, and a gated counter 83. Circuit 46 also includes a clock oscillator 84, which is preferably a crystal controlled, temperature compensated oscillator, a transfer and reset control circuit 85, and a data processor 87.

A data converter is formed by the assembly of the aforementioned gate generator 82, gated counter 83 and clock oscillator 84. An additional part of the logic means includes the assembly of the control period counter 80, control channel counter 81, transfer and reset control circuit 85 and data processor 87.

Figure 4A:
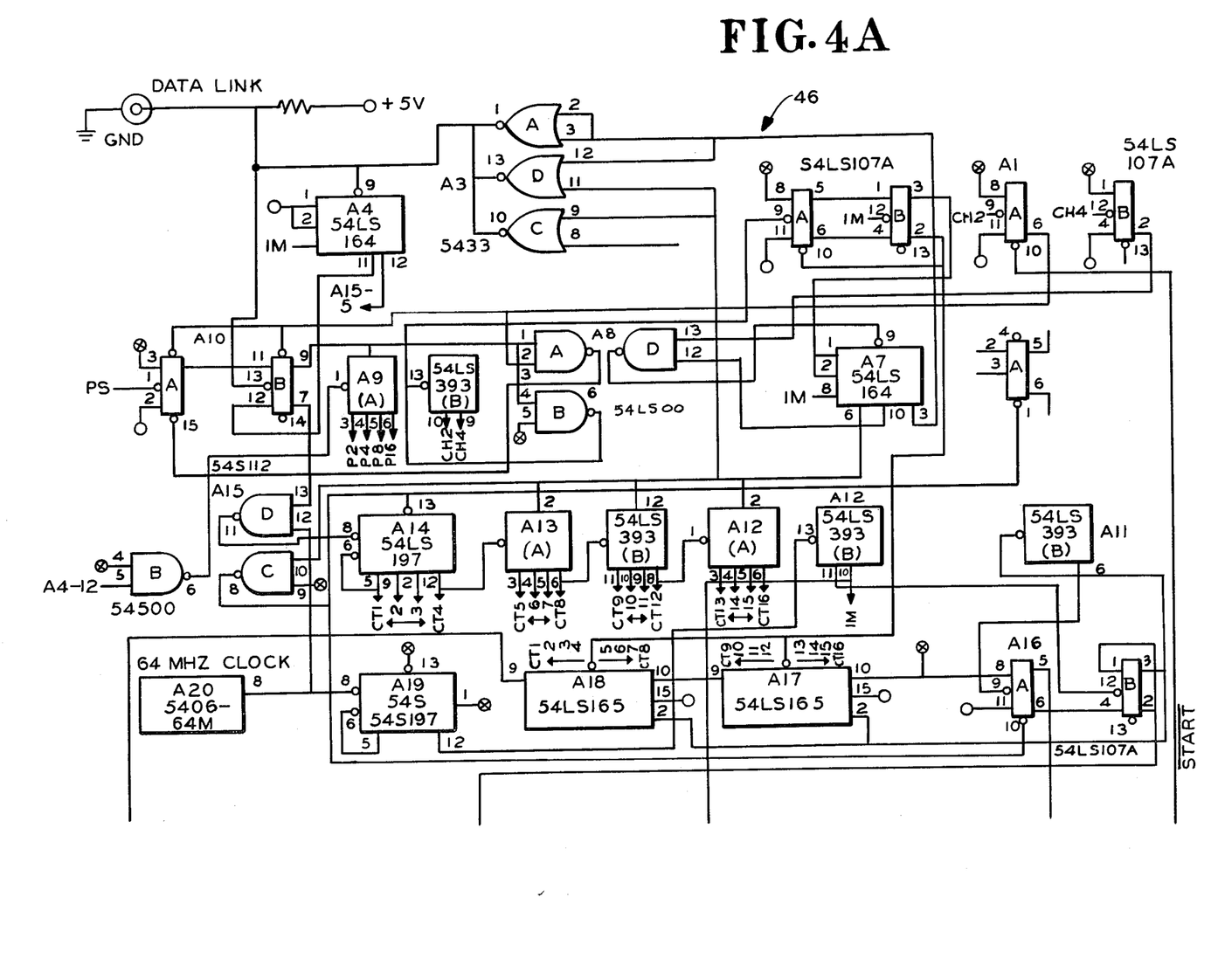
FIG. 4A and FIG. 4B are schematic drawings of two parts of the control circuit portion of FIG. 3.
Figure 4B:
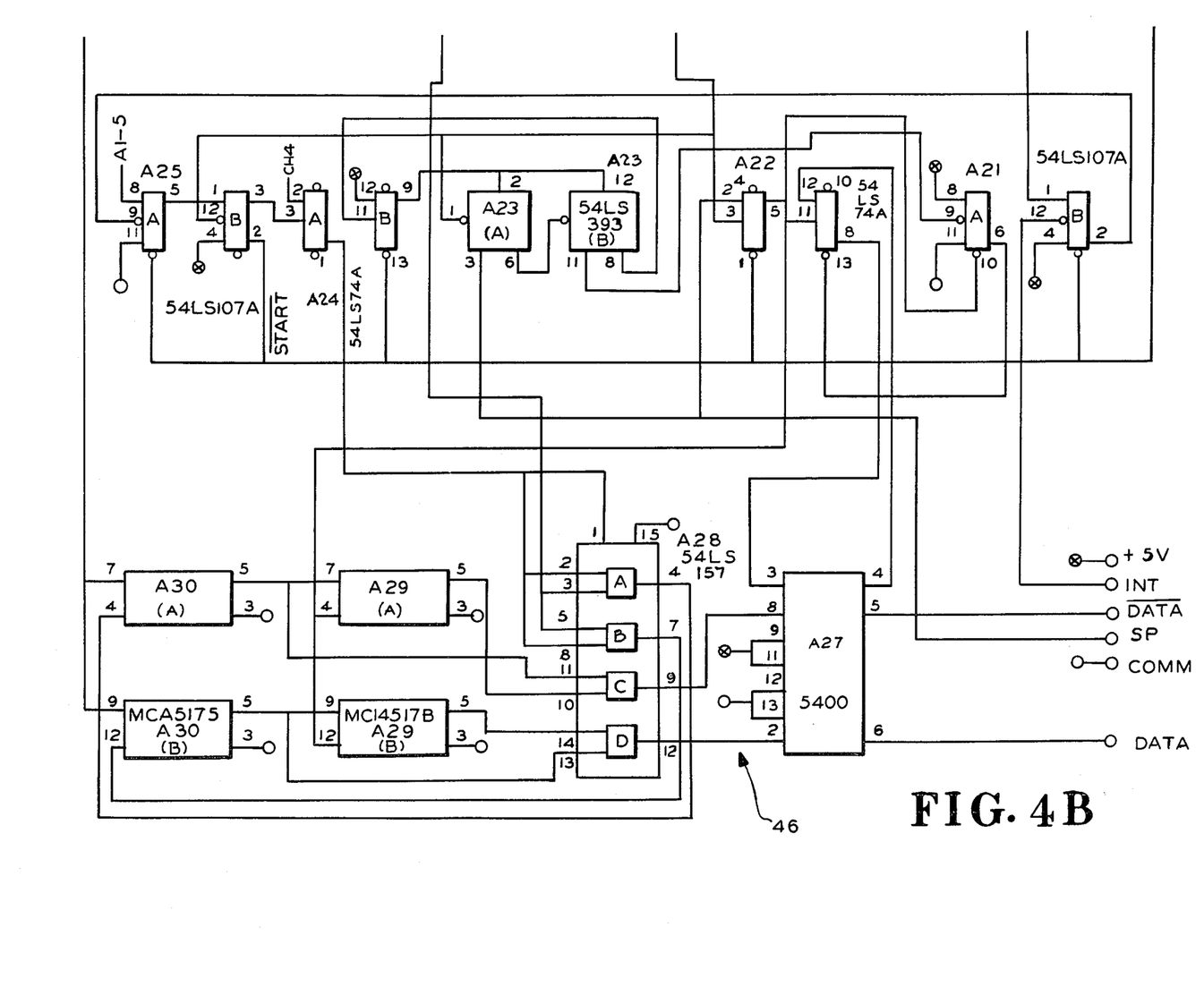

In FIG. 4A and FIG. 4B, control period counter 80 includes shift register A4, gate A15B and ripple counter A9A. Control channel counter 81 includes the flip-flops of A1, gate A8B and ripple counter A9B. Gate generator 82 includes the flip-flops of A10. Gated counter 83 includes gate A15D, and ripple counters A14, A13A, A13B and A12A. High frequency clock oscillator includes A20. Transfer and reset control circuit 85 includes flip-flops of A2, gate A8D and shift register A7. Data processor includes ripple counter A19, output data shift registers A17 and A18, timing and control flip-flops of A16, A22, A24, A25, the 64 bit shift registers of A29, A30, the quad 1 of 2 selector A28, and adder/subtractor A27.

Each of the above A-number parts has respective pins, marked 1, 2, 3, etc., as shown in FIG. 4A and FIG. 4B. It is noted that a cut line at the bottom edge of FIG. 4A corresponds to a cut line at the top edge of FIG. 4B; so that five leads only are cut along such common cut line.

The pickoff circuit 14, which is constructed to supply N channels of data comprises sensor circuit 44 and control circuit 46, as shown in FIG. 1. Sensor circuit 44 comprises:

(a) the 2N identical precision resistors of network 76, which are connected in series with 2N individual pickoff elements 24, 26, 28, 30, 36, 38, 40, 42, with a common drive 90 and a common ground.

(b) the 2N channel multiplexer 52 which, in reaction to a digital selection code, selects, in sequence, the ungrounded side of each pickoff element for transmission to comparator 62.

(c) the differential comparator 62 with the multiplexer output connected to one input terminal and a resistive divider, between the drive to the resistor/pickoff matrix and ground, connected to the other input.

(d) amplifier 50, whose output supplies drive to the resistor/pickoff matrix and whose input is supplied from the comparator output, and which provides power amplifications and level shifting, as required, of the comparator signal.

(e) Index counter 58, which is advanced by a pulse from the control circuit 46 on the data link 48 and delivers an advance pulse to the channel counter 56.

(f) channel counter 56, which advances one count after each output pulse from the index counter 58, and which has 2N binary stages and the output of which supplies the selector code to the multiplexer 52.

The control circuit block diagram is shown in FIG. 3. Control circuit 46 comprises (a) a period counter 80, which is indexed by each pulse on the data link and arranged to select a predetermined number of oscillator periods for measurement; (b) a channel counter 81, indexed by an output of the period counter, and used to generate a pulse on the data link following each channel measurement, and a double pulse following each complete sequence of channel measurements; (c) a gate generator 82, which accepts data link pulses and an output from the period counter, and generates a timing gate at its output; (d) a gated counter 83, which counts pulses during the timing gate, said pulses derived from (e) a high frequency clock oscillator 84; (f) a transfer and reset control circuit 85, which, at the end of each timing gate, first provides a transfer pulse to effect a transfer of data from the gated counter and then a reset pulse to reset the gated counter; (g) a data processor 87, which accepts digital data from the gated counter upon reception of the transfer pulse and sequentially computes the displacement error of each sensor by generating the difference of the two appropriate data word inputs from the gated counter, and formats these error computations for introduction to digital filters in the sensor capture loops.

The structure, in detail, such as the leads and resistors, of sensor circuit 44 and of control circuit 46 is explained hereafter; and the operation thereof will be explained thereafter.

As shown in FIG. 2, amplifier 50 of sensor circuit 44 includes an inverting input lead 86, a non-inverting input lead 88, and an output lead 90.

Multiplexer 52 includes a positive supply lead 92, a negative supply lead 94, first ground lead 96, a second ground lead 98, a first selector code lead 100, a second selector code lead 102, a third selector code lead 104, a plurality of signal input leads 106, 108, 110, 112, 114, 116, 118, 120, and an output lead 121.

Channel counter 56 includes an input clock lead 122, output pins 124, 126, 128, which connect respectively to leads 100, 102, 104, and includes a reset lead 130.

Index counter 58 includes an input lead 132, output leads 134, 136, and a reset lead 138.

Inverter assembly 60 includes a first inverter 140, a second inverter 142, and a third inverter 144. First inverter 140 has an input lead 146, and an output lead 148. Second inverter 142 has an input lead 150, and an output lead 152. The inputs 146 and 150 are connected in parallel. The outputs 148 and 152 are also connected in parallel, to supply sufficient drive to the data link network (A8) 72. Third inverter 144 has an input lead 154, and an output lead 156. Input lead 154 receives the least significant bit (LSB) of period counter 58 on line 136. The output on lead 156, which connects to clock lead 122, is pulled up to +5 V when in the logic one state.

In the inverter assembly 60, the outputs 148 and 152 are pulled up to +5 V by resistor 158, and the output 156 is pulled up to +5 V by resistor 160.

Comparator 62 includes an inverting input lead 162, a non-inverting input lead 164, a true output lead 166, and a complementary output lead 168.

First multivibrator 66 includes, a clock input lead 170, a positive output Q lead 172, a negative output $\overline{Q}$ lead 174, and a timing control input lead 176. Second multivibrator 68 includes, a clock input lead 178, a negative output $\overline{Q}$ lead 180, and a timing control input lead 182.

Control flip-flop 70, which is a J-K type of flip-flop includes a J input lead 184, which is connected to ground, a K input lead 186, which is connected to +5 V, a clock input lead 188, a $\overline{Q}$ output lead 190, and a preset input lead 192.

Amplifier network 72 includes a first pullup resistor 194 and a second pullup resistor 196, which effect the pullup to +5 V of output leads 166 and 168 of the comparator 62. Network 72 also includes a third resistor 198, a fourth resistor 200, a fifth resistor 202, and a sixth resistor 204. Resistors 198, 200, 202, and 204 are arranged so that amplifier 50 supplies an inverted amplification of the true output of comparator 62.

As shown in FIG. 2, input network 74 includes a resistor 206 and a capacitor 208, which control the width of the output pulse of multivibrator 66. Network 74 also includes a resistor 210 and a capacitor 212, which control the width of the output pulse of multivibrator 68. Network 74 also includes a first resistor 214 and a second resistor 216, which form a divider of the output signal of amplifier 50, for introduction to the non-inverting input lead 164 of the comparator 62. Network 74 also includes a capacitor 218, which is disposed in parallel with second resistor 216, in order to provide high frequency filtering. Network 74 also has a capacitor 220, which is employed as a high frequency filter for the multiplexer output 121, which is also connected as the non-inverting input lead 164 of comparator 62.

Reference resistor network 76 includes eight high stability resistors 222, 224, 226, 228, 230, 232, 234, 236.

Trim resistor network 78 includes eight selected resistors 238, 240, 242, 246, 248, 250, 252 which are selected during a trimming operation, and includes eight shunt trim resistors 254, 256, 258, 260, 262, 264, 266, 268, which are also selected during the trimming operation. The trim network 78 is arranged so that each pickoff element, for example element 24, is supplied current from the amplifier 50 output through the high stability resistor 222, the series trim resistor 238, and shunt trim resistor 254, across the combination of the previous two resistors 222 and 238.

A general explanation of the operation of pickoff system 10 is presented hereafter in paragraphs 1 through 10.

The approach to pickoff digitizing of pickoff system 10 consists of independent sequential measurements of the inductances exhibited of the two diametrically opposed cores, for example 24, 26 of the standard pickoff, of gyro 20, and determination of gyro displacement error as proportional to the difference of these measurements. Inductance measurement is accomplished by introduction of core impedance (primarily L) to an astable multivibrator 64, whose oscillating frequency is a direct function of R/L, where R is a highly stable resistor, for example 222, placed in series with the pickoff core 24. The period of multivibrator oscillation (directly proportional to L) is measured by gating a high frequency clock into a counter (64 MegaHertz used in present circuitry). Firstly, a pickoff element with inductance $L_1$ is selected by the multiplexer and a digital measurement of the resultant oscillating period made. Then that pickoff's companion element with inductance $L_2$ is selected and a similar measurement made. The difference of these two digital measurements is then computed and becomes a measure of pickoff displacement. Thus the error sensed by the pickoff circuitry 14 is proportional to $(L_1-L_2)$ where $L_1$ and $L_2$ are the respective inductances of the opposing cores of a pickoff assembly. The error sensed by the standard prior art, analog system is directly proportional to $(L_1-L_2)/(L_1+L_2)$. Since $(L_1+L_2)$ is virtually constant for small error angles, the present invention and analog systems produce essentially the same error response.

The pickoff circuitry 14, as shown in FIG. 1, is presently partitioned with sensor circuit 44 assumed to be on the platform connected by a data link 48 to the control circuit 46, which is remote from the platform on which gyros 16 and 18 are mounted. In the present concept the DC supply voltages ($\pm 10$ to $\pm 15$ VDC) required by the sensor circuit 44 are presumed to be available on the platform. +5 VDC is also required.

The sensor circuit 44 schematic is presented in FIG. 2. It consists essentially of a free running multivibrator with multiplexed feedback paths from the 8 cores 24, 26, 28, 30, 36, 38, 40, 42, of a 4-axis system, a channel counter 56 which receives pulses from the control circuit 46 and controls multiplexer indexing, and the components of a data link 48 which carries the above pulses from the control circuit and also sends pulses to the control circuit 46 on the negative-going excursions of the multivibrator 64. Series and shunt trim capability of the resistances in series with the cores is provided for frequency adjustment and pickoff nulling. Very high speed components are used in the multivibrator 64 and data link 48 to minimize jitter and present sharp leading edges for high resolution period measurement in the control circuit 46. The control circuit 46 schematic is presented in FIG. 3. It consists of:

data link components for communication with the sensor circuit 44.

A channel counter 81 which tracks the channel counter 56 of the sensor circuit 44 and originates a channel counter reset pulse sent to the sensor circuit 44 over the data link 48 to properly synchronize both counters.

A period counter 80 which determines the number of periods of the multivibrator oscillation which are to be counted for each core selection.

A gated counter 83 which counts the total time required for the number of periods of oscillation selected. The gated counter includes a 16 bit output shift register A17, A18, to which gated counter output is parallel transferred and from which this data is serially shifted to memory shift registers in a data processor 87, as described hereinafter.

A 64 MegaHertz crystal oscillator 84 which serves as a clock for the gate counter and a reference from which various shift pulse trains are generated.

A data processor 87 which contains four 64 bit memory shift registers A29, A30, which serially store the gate counter outputs as they are generated and output this data in 64 bit strings following each interrogation pulse. The data processor 87 includes a serial substractor A27 which accepts the 64 bit strings and effects subtraction of the most recent B core measurements from the most recent A core measurements and outputs a 64 bit error data word following each interrogation. (A pickoff consists of two diametrically opposed cores, A and B). The data processor also includes a countdown chain providing frequencies from 64 MegaHertz to 250 KiloHertz and various sequencing control and shift pulse generating circuits.

The essential purpose of the control circuit 46 is the measurement of the period of oscillation of the multivibrator as it "samples" each pickoff core. The oscillation frequency is constrained at the high end by parasitic effects in the cores and at the low end by power considerations. A reasonable middle ground, with gyroscopes used in prototype circuitry, is obtained with frequencies between 50 and 75 KiloHertz.

After each period measurement a pulse is generated in the control circuit 46 and transmitted via the data link 48 to the sensor circuit 44, which then advances its channel counter 56 and directs the multiplexer 52 to switch to the next core to be sampled. Obviously the new core's oscillating period measurement cannot begin until the next crossover of the multivibrator output, and some time is also required to dump the gated counter data into its output shift register and reset the counter.

Therefore, a "housekeeping" interval is employed and the next period measurement commences on the next negative-going excursion of the DAD multivibrator. This allows relatively slow transitions of the multiplexer and sufficient time for effects of "initial conditions" of the multivibrator to be cleared away.

Control circuit 46 has been designed to make measurements of one core of each pickoff per interrogation pulse. Measurements of the opposing cores of these pickoffs are made on alternate interrogation pulses.

A jumpering scheme, as shown at the top of FIG. 4A, permits selection of the number of multivibrator periods to be measured in each core sampling, i.e., 4, 8, 16 or 32. By adjustment of nominal multivibrator frequency, selection of clock reference frequency and this period selection a very wide range of error resolution is available.

A detailed explanation of the operation of sensor circuit 44 is presented hereafter in paragraphs a through e.

(a) The schematic of the sensor circuit 44 is presented in FIG. 2. The multivibrator's comparator is buffered by a wide band inverting amplifier 50. This buffering is needed to center output levels at zero volts and to supply enough current to drive all eight cores.

(b) The data link connection is shown to the right of the schematic. Output pulses are applied to the link from the top two inverters of inverter assembly 60. The data link receiver is a one-shot multivibrator 66 which generates positive and negative one microsecond pulses (positive on line 172, negative on line 174), for each negative-going excursion on the data link. It thus reacts to both "sent" and "received" pulses. 68, a retriggerable six microsecond one shot is triggered on the falling edges of the positive pulses of 66. Whenever 68 is inactive, i.e., in its non-triggered state, it holds the index counter 58 in its reset state.

(c) The multiplexer 52 has line 121 for its output. Channel selection is determined by the input code on lines 100, 102, 104, supplied from the channel counter 56. This counter is incremented each time the first bit of the index counter 58 goes to the "1" state. This, it may be seen, requires a pulse from 66 while 68 is active, i.e., when two data link pulses occur within less than 7 microseconds of one another. A 1 microsecond negative pulse is "sent" over the data link 48 on each negative going swing of the multiplexer output (which normally will occur every 12 to 18 microseconds) via 62, 70, 60. Thus multiplexer indexing can only result when a "received" pulse from the control circuit 46 is interleaved with the "sent" pulses.

(d) It should also be noted that the channel counter 56 will be reset whenever the second bit of the index counter 58 goes to the "1" state. This requires that a succession of 3 pulses appear on the data link 48 with a maximum pulse-to-pulse spacing of 7 microseconds.

(e) The control circuit 46 is designed to send one 1 microsecond pulse up the data link 48 with 3.5 to 4.5 microseconds following that multiplexer transition which completes one core measurement interval, thus advancing the multiplexer 52 to the next core and setting up for the next core measurement interval. After 8 successive advancements of the multiplexer 52 (2 interrogation pulses) an additional one microsecond pulse, following the indexing pulse by 4 microseconds, is sent up to the sensor circuit 44 to reset its channel counter 56, thus guaranteeing a channel sequence lock.

A detailed explanation of the operation of control circuit 46 is explained hereafter in paragraphs a through f.

(a) The primary functions of the control circuit 46 are:
 (1) Control of the indexing of the channel counter 56, hence the multiplexer selection, in the sensor circuit 44.
 (2) Digital measurement of the time required for one or more periods of multivibrator oscillation while selecting a particular core of the gyro pick-off elements.

(b) These digital time measurements might then be introduced to a computer, not shown, in serial or parallel form. The computer could determine the differences in period between oscillation with one core of a pickoff and its diametrically opposed companion core, i.e., a digital evaluation of each axis' pickoff displacement.

(c) The control circuit 46 includes the circuitry necessary for the computation of displacement errors and generation of a serial 64 bit error "word" (16 bits per axis) for utilization by a digital processor (not shown) which, in reaction to displacement data, might generate digital commands to torquer amplifiers (not shown) involved in loop closure.

(d) The schematic of the control circuit 46 is presented in FIG. 4A and 4B. The manufacturer's part numbers, e.g., 54LS164, for part A4, of one prototype of the embodiment, are shown in FIG. 4A and FIG. 4B. A summary of the control sequence follows:
 (1) The negative going edge of the Interrogate pulse (introduced at bottom right of FIG. 4B) sets flip-flop A21B which, in turn, sets flip-flop A25A. This prepares A25B for setting on the next negative excursion of the 1 MegaHertz internal clock (derived from the 64 MegaHertz oscillator A20 and the countdown chain A19 and A12B).
 (2) A25B is set for 1 microsecond, then reset. This "START" pulse (appearing at A25B pin 2) commences sequences in the parts of the circuit shown in FIG. 4A, which performs the "data gathering" function, and sequences in the parts of the circuit shown in FIG. 4B, which perform the "data outputting" function. We will treat the data gathering section first.
 (3) The $\overline{\text{START}}$ pulse resets flip-flop A1A and A1B. The A1A-$\overline{\text{Q}}$ output, which becomes a logical "1", removes the direct set of flip-flops A10A and A10B. The A1A-$\overline{\text{Q}}$ output, via NAND gate A8A, removes the reset on null period counter A11A and applies direct reset to A10A, thus preparing A10B for resetting on the next negative pulse from the data link network (upper left corner of FIG. 4A).
 (4) Reset of A10B occurs as the DAD multivibrator output swings negative, thereby generating a negative pulse on the data link. This pulse exhibits very rapid fall time and A10B is a fast acting flip-flop so that the timing gate at its $\overline{\text{Q}}$ output (pin 7) exhibits minimum jitter relative to the multivibrator's change of state. This output enables NAND gate A15D, which gates the 64 MegaHertz clock into the 16 bit gate counter A14, A13 and A12A.
 (5) The resetting of A10B, besides starting the counting process, also removes the reset from the period counter A9A and, via A8A, removes the direct reset of A10A.
 (6) Each data link pulse resets delay timer A4, which is an 8 bit shift register clocked at 1 MegaHertz.

Thus outputs at pins 11 and 13 immediately go to "0" but return to the "1" state nominally 6 and 8 microseconds, respectively, following the data link pulse. As pin 13 returns to a "1" period counter A9A is indexed via A15B. The number of multivibrator periods to be measured is selected by the jumper arrangement at the top of the page. For example, if 8 periods are desired, pin (14) is jumpered to pin (9), the former coming from the period counter A9A and the latter being the clock input to A10A. Thus, 8 microseconds following the seventh data link pulse after the start of the measurement period, A10A is set, preparing A10B to be set, and end that channel's measurement period, by the next data link pulse.

(7) Upon setting of A10B gate A15D is inhibited and gate counting stops. The period counter A9A is reset and, via gate A8A, A10A is reset. Also, via gate A8B, the channel counter A9B is incremented and flip-flop A2A is set. Flip-flop A2B is set on the next negative excursion of the 1 MegaHertz clock and reset 1 microsecond later. While it is set information from the gate counter is loaded into the 16 bit shift register A18 and A17 via the connection to pins 1 of these devices ("load") from A2B-$\bar{Q}$. The A2B-Q signal is shifted into an 8 bit sequence control shift register A7 which is clocked at a 1 MegaHertz rate. The outputs of this register are 1 microsecond positive pulses appearing at pins 6, 10 and 13 starting nominally 4, 5 and 8 microseconds, respectively, following the transfer of gate counter data to the 16 bit register.

(8) The output pulse at pin 6 of A7 causes reset of the gate counter (positive pulse to A13A, A13B and A12A, negative pulse to A14 via gate A15C). This pulse is also directed to power NOR gates A3C and A3D to generate a data link pulse for the incrementing of the channel counter in the DAD sensor circuit and stepping of its multiplexer. The NOR gate arrangement used is to provide the high current drive required on the 75 ohm data link line.

(9) The negative pulse used to reset gate counter section A14 also resets flip-flop A16A. This enables toggling of flip-flop A16B which is clocked at 2 MegaHertz. After 16 positive pulses have been generated at the A16B-$\bar{Q}$ output counter A11B causes setting of A16A and termination of the pulse train. This pulse train shifts the data in the 16 bit shift register A17 and A18, previously loaded from the gate counter, to the inputs of dual 64 bit shift register A30 in the "data outputting" section of the DAD control circuit, as shown in FIG. 4B. Thus the first channel's measurement data is transferred. How this is handled in the "data outputting" section will be discussed later. We continue here with further sequences generated in the "data gathering" section.

(10) We noted in (9) above that the channel counter A9B was incremented at the end of the first measurement period. We also noted that nominally 4 microseconds later a positive 1 microsecond pulse appeared at pin 6 of sequence control shift register A7 and that pin 10 of this component would become a "1" at the end of the positive pulse at pin 6. We had also previously noted that the "START" pulse had reset flip-flop A1B. If the "CH4" output (pin 9) of the channel counter does not go to a "0" level when the channel counter is incremented at the end of a specific measurement period (which would set A1B), NAND gate A8D will cause a reset of A7 immediately following the appearance of a "1" at its pin 10. Hence pin 13, further down the shift register, is prevented from reaching the "1" level as shifting continues; hence no pulse is impressed on the data link by NOR gates A3A and A3D by virtue of signal at A7 pin 13.

(11) As the measurement sequence of a particular channel ends with the setting of flip-flop A10B and the advancement of the channel counter A9B, if the "CH2" output (pin 10) of the channel counter does not reach a "1" level (which would set flip-flop A1A), flip-flop A10A is reset via NAND gate A8A. Therefore A10B is prepared to reset on the next negative pulse from the data link. As it occurs, another measurement, data transfer and shift-out sequence will ensue.

(12) Eventually, at the termination of a measurement cycle and the associated incrementing of the channel counter A9B, its "CH 2" output (pin 10) will go to a "0" level, thus setting flip-flop A1A, which will hold gating flip-flop A10B in the set state. Any ensuing negative pulses on the data link due to multivibrator negative excursions will not cause resetting of flip-flop A10B, unless flip-flop A1A has been reset by a "START" pulse resulting from an interrogation.

(13) The sequence to be expected therefore, after an initialization cycle, is that 4 "channel", "axis" or "core" measurements will result from each interrogation pulse received. After each measurement the control circuit will send a pulse to the sensor circuit on the data link which will advance the sensor's multiplexer to the next core. Each interrogation will advance the channel counters in both the sensor and control circuit by 4 counts.

(14) The "CH 4" output (pin 9) of the control circuit's channel counter A9B will change from a "1" to a "0" for every 8 counts it is advanced. Thus, at the end of the last measurement period of alternate interrogation pulses, flip-flop A1B will be set and the inhibition of the pulse at pin 13 of A7, as discussed in (10) above will not take place. Therefore, under these conditions a one microsecond positive pulse will appear at this terminal 4 microseconds after the "indexing" pulse at pin 6 of A7 is generated. The pulse at pin 13 is applied to the data link via NOR gates A3A and A3D and serves to reset the channel counter 56 in the sensor circuit, thus providing a lock of the channel counters in both the sensor and control circuits and ensuring the sequence of data output following an interrogation pulse.

(15) We return now to the reaction of the "data outputting" section to the "START" pulse generated by A25B in response to an interrogation pulse. The negative or $\overline{\text{START}}$ pulse generated at A25B-$\bar{Q}$ (pin 2) resets flip-flops A25A, A24B, A22A and A21B. The positive START pulse generated at A25B-Q (pin 3) provides a clock to flip-flop A24A. If the state of the "CH 4" output of the channel counter A9B has changed since the last START pulse, which it normally will, A24A will change state. A change of state A24A will switch the 4 outputs of selector A28 to their alternate sources. We will return to the function of the selector later.

(16) The START pulse at A25B-$\bar{Q}$ (pin 2) also resets flip-flop A24B which, in turn, removes the direct resetting of 8 bit counter A23, thereby enabling its indexing by the applied one MegaHertz clock. As the 8th bit of this counter goes to a "1", flip-flop A24B is clocked to a set condition again, thereby reapplying direct reset to the counter. This process causes a train of 64 positive pulses at a 500 Kilo-Hertz rate to be generated at the output (pin 3) of the first bit of the 8 bit counter. The 5th bit of this counter goes to a "0" at the end of each 16th positive pulse of the 64 pulse train, and is utilized to set flip-flop A21A, which in turn applies a direct reset to flip-flop A22B. The A22B-$\bar{Q}$ output (pin 8) is the "carry" input (pin 3) of adder A27.

(17) The $\overline{\text{START}}$ pulse at A25B-$\bar{Q}$ (pin 2) also applies a direct reset to flip-flop A22A. When this reset is removed the output A22A-Q (pin 5) follows the form of the 64 pulse train generated at A23A pin 6 but lags by $\frac{1}{2}$ microsecond, since it changes state on positive-going excursions of the one MegaHertz clock, whereas the pulse train changes state on the negative going excursions of the same clock. This delayed clock is applied the carry flip-flop A22B, 64 bit shift registers A29A and A29B, and to either 64 bit shift register A30A or A30B, depending upon the state of selector A28.

(18) The adder A27 is arranged to perform the subtraction process necessary for pickoff displacement measurement, wherein the differences of the counts accumulated in the gate counter for opposing core samples is representative of this displacement. If we denote one core of each pickoff as core A and the other as core B and let the numbers X and Y represent the gate counter outputs for these core samplings, the digitized displacement error is (X−Y).

(19) The sequence of data flow in the 64 bit shift registers is as follows: After a given interrogation pulse, selector A28 is placed in state 0 where the lower inputs to its 4 selectors appear on the selector outputs. This causes data generated while sampling pickoff elements 1A, 2A, 3A and 4A to shift (LSB first) into A30A, a 64 bit shift register, as it is outputted in 16 bit trains from the 16 bit shift register A17/A18. Following the next interrogation pulse, selector A28 is placed in state 1 where the upper inputs to the selector appear as outputs, and the data in A30A is shifted into A29A, another 64 bit shift register, and into the "X" input (pin 8) of adder A27 in one continuous 64 bit train. Following the next interrogation pulse, selector A28 returns to state 0 and the data in A29A is shifted into the "X" input of adder A27, also in a 64 bit train. Thus on alternate interrogation pulses the "X" input of the adder receives "new" and "old" data from the A cores of the gyro pickoffs. Similarly the "$\bar{Y}$" input (pin 2) of the adder receives "old" and "new" data from the B cores of the gyro pickoffs. Since the carry input is set at the start of each 16 bits of data, i.e., at the start of each channel's data output, the adder performs the function (X+$\bar{Y}$+1) or (X−Y). The net sequence of output data for successive interrogation pulses is therefore ($A_{NEW}-B_{OLD}$), ($A_{OLD}-B_{NEW}$), ($A_{NEW}-B_{OLD}$), etc.

(20) Therefore, the least significant bit of axis #1 displacement appears on the "data" output pin 5 of A27 as soon as the selector state of A28 changes following an interrogation pulse. One microsecond later a positive shift pulse is applied to the "SP" output. The data receiver must then accept data on positive going excursions of the "SP" output. One-half microsecond after each positive shift pulse the carry flip-flop A22B is clocked and assumes the state of the signal appearing at the $\overline{\text{CARRY}_N}$ output (pin 4) of adder A27. The A22B-$\bar{Q}$ output (pin 8) is then used as the $\text{CARRY}_{N+1}$ input to the adder. Simultaneously with the strobing of the carry flip-flop A22B, data is shifted in 64 bit shift registers A29A, A29B, and A30A or A30b, as selected, entering the next data bit into adder A27. The data shift and subsequent subtraction procedure may require up to 0.6 microseconds for stabilization, which still allows a minimum of 0.9 microseconds for data rise time in the serial data line and receiver set-up before the next "SP" pulse clocks this data into the receiver.

(e) The logic connections of flip-flops A21B and A25A employed here were designed to permit self-interrogation at the end of each measurement sequence, as well as to permit external interrogation. For self-interrogation the output of A15-6 is connected to the "INT" input which is connected to A22B-12. This supplies an interrogation pulse 6 to 7 microseconds after the leading edge each data link pulse. If data shift from the 16 bit register A17/A18 is not taking place at this time, flip-flop A22B is reset and a clocking pulse is applied to flip-flop A25A. If, at this time flip-flop A1A is in the set condition, a "START" pulse will be generated and a measurement cycle will result. With this connection, therefore, a "START" is normally generated 6 to 7 microseconds after the first negative-going excursion of the DAD multivibrator output following completion of a four channel measurement cycle. (Data shift from the 16 bit shift register A17/A18 is complete 18.5 to 19.5 microseconds following the last negative going multivibrator excursion in a measurement cycle. During this interval the multivibrator will normally have gone through a subsequent negative-going excursion). For "self" interrogation, therefore, a new measurement cycle takes place every (4N+5) periods of the oscillating multivibrator, where N is the number of oscillation periods selected for measurement of a core's inductance. For example: If N were selected as 8 and a single oscillation period was nominally 15 microseconds, the nominal interrogation interval would be (4.8+5) or 37 periods, i.e., 555 microseconds, generating an effective interrogation rate of 1802 Hertz. For external interrogation, pulses are applied to the "INT" terminal from an external source. Should the external source frequency exceed the nominal 1802 Hertz noted above, a "count down" will occur wherein conversion takes place only for each 2nd, 3rd, etc. pulse of the pulse source.

(f) It should be pointed our that other conversion sequences than the one for which this control circuit was designed are practicable, but that the one selected approaches minimum hardware, power and interconnection requirements.

An alternate embodiment of the present invention for inertial devices with capacitive pickoffs can be provided by modifying the multivibrator parts as shown in FIG. 2, from a resistance-inductance (RL) type oscillator to a resistance-capacitance (RC) type oscillator.

It will be apparent that the embodiment of the invention herein disclosed fulfills the objects of the invention, and is subject to modification without departing from the scope of the subjoined claims.

What is claimed is:

1. A digitized pickoff system, particularly for an inertial sensor of an inertial navigation instrument to sense its angular displacement, having at least one pair of mutually spaced pickoff elements, the relative position of which is sensed to provide a corresponding output signal, comprising:
   (a) a relaxation oscillator (50, 52, 62, 72, 74, 76) adapted to be sequentially connected to said two pickoff elements (24, 26, 28, 30, 36, 38, 40, 42) so that the resulting oscillating frequency is a function of the air gap and therefore of the position of the respective pickoff element selected,
   (b) a data converter and frequency measuring means (82, 83, 84) connected to said relaxation oscillator (50, 52, 62, 72, 74, 76) to measure the period of the oscillating frequency, and
   (c) a logic circuitry (48, 56, 58, 60, 64, 70, 80, 81, 85, 87) connected to said data converter and frequency measuring means (82, 83, 84) for providing a digital output signal corresponding to the oscillating frequency period difference as a measure of the relative position of said two pickoff elements (24, 26, 28, 30, 36, 38, 40, 42), wherein said relaxation oscillator comprises:
   (a1) a reference resistor network (76) having a resistor (222, 224, 226, 228, 230, 232, 234, 236) for each pickoff element (24, 26, 28, 30, 36, 38, 40, 42) which resistor is adapted to be connected to said pickoff element,
   (a2) a comparator (62) having a non-inverting input (164), an inverting input (162), a first output line (166) connected to said reference resistor network (76) for driving said resistor network and said pickoff elements (24, 26, 28, 30, 36, 38, 40, 42) and a second output line (168) connected to said logic circuitry (48, 56, 58, 60, 64, 70, 80, 81, 85, 87),
   (a3) a comparator input network (74) having a divider (214, 216) in which the input side of said divider is connected to said reference resistor network (76) and the output side is connected to the non-inverting input (164) of said comparator (62), and
   (a4) a multiplexer (52) for selecting said pickoff elements in which the input is connected to said pickoff elements (24, 26, 28, 30, 36, 38, 40, 42), and in which the output is connected to the non-inverting input (162) of said comparator (62) and the input of said logic circuitry (48, 56, 58, 60, 64, 70, 80, 81, 85, 87).

2. A pickoff system according to claim 1, wherein the outputs of said comparator (62) are connected to said reference resistor network (76) through an amplifier network which in turn is connected to the high speed differential amplifier, where the first output line (166) of said comparator (62) is connected to said amplifier network (72) for driving said high speed differential amplifier (50) and the divider (214, 216) of said comparator input network (74).

3. A pickoff system according to claim 2, wherein said data converter and frequency measuring means comprises:
   (b1) a gating pulse generator (82) connected to said relaxation oscillator (50, 52, 62, 72, 74, 76) and providing a gating interval,
   (b2) a gated counter (83) connected to and controlled by said gating pulse generator (82), and
   (b3) an oscillator (84) connected to said gated counter (83) and providing clock pulses for timing reference purposes.

4. A pickoff system according to claim 3, wherein said oscillator (84) is crystal controlled and temperature compensated.

5. A digitized pickoff system, particularly for an inertial sensor of an inertial navigation instrument to sense its angular displacement, having at least one pair of mutually spaced pickoff elements, the relative position of which is sensed to provide a corresponding output signal, comprising:
   (a) a relaxation oscillator (50, 52, 62, 72, 74, 76) adapted to be sequentially connected to said two pickoff elements (24, 26, 28, 30, 36, 38, 40, 42) so that the resulting oscillating frequency is a function of the air gap and therefore of the position of the respective pickoff element selected,
   (b) a data converter and frequency measuring means (82, 83, 84) connected to said relaxation oscillator (50, 52, 62, 72, 74, 76) to measure the period of the oscillating frequency, and
   (c) a logic circuitry (48, 56, 58, 60, 64, 70, 80, 81, 85, 87) connected to said data converter and frequency measuring means (82, 83, 84) for providing a digital output signal corresponding to the oscillating frequency period difference as a measure of the relative position of said two pickoff elements (24, 26, 28, 30, 36, 38, 40, 42), wherein said logic circuitry comprises:
   (c1) a sensor channel counter (56) having a clock input (122) and a selection signal output (124, 126, 128) connected to the inputs of said relaxation oscillator,
   (c2) a sensor period counter (58) having an output (136),
   (c3) an inverter assembly (60) having a first inverter (144) in which the input side is connected to the output (136) of said sensor period counter (58) and the output is connected to the clock input (122) of said sensor channel counter (56), and having a second and third inverters (140, 142) in which the outputs are connected to said data converter and frequency measuring means, and
   (c4) a control flip-flop (70) in which the input is connected to the output of said relaxation oscillator and the output is connected to the inputs of said second and third inverters (140, 142) of said inverter assembly (60).

6. A pickoff system according to claim 5, including a data link (48) having a single line for communication between said relaxation oscillator and said data converter and frequency measuring means and including a multivibrator (64), wherein the output of said second and third inverters (140, 142) of said inverter assembly (60) are connected to the input of said data link (48), said multivibrator (64) is connected to said data link (48), and the output of said multivibrator is connected to the input of said control flip-flop.

7. A pickoff system according to claim 6, wherein said logic circuitry further comprises:
   (c5) a control period counter (80) in which the input is connected to said data link (48) and the output is connected to said data converter, (c6) a control channel counter (81) in which the input is connected to the output of said control period counter (80), (c7) a transfer and reset control circuit (85), in which the inputs are connected to the outputs of said data converter, and (c8) a data processor (87) in which the input is connected to the output of said transfer and reset control circuit (85).

* * * * *